US005445009A

United States Patent [19]

Yang et al.

[11] Patent Number: 5,445,009

[45] Date of Patent: Aug. 29, 1995

[54] APPARATUS AND METHOD FOR DETECTING HUMIDITY IN A MICROWAVE OVEN

[75] Inventors: Woo J. Yang; Hyoung T. Lim; Sung J. Han, all of Seoul, Rep. of Korea

[73] Assignee: Goldstar Co., Ltd., Seoul, Rep. of Korea

[21] Appl. No.: 159,852

[22] Filed: Nov. 29, 1993

[30] Foreign Application Priority Data

Nov. 27, 1992 [KR] Rep. of Korea .................... 92-22590

[51] Int. Cl.$^6$ ........................ G01W 1/00; G01N 27/04

[52] U.S. Cl. .................................. 73/29.01; 219/707; 73/335.05

[58] Field of Search .................... 73/73, 29.01, 335.05, 73/335.02; 219/707

[56] References Cited

U.S. PATENT DOCUMENTS 4,270,085 5/1981 Terada et al. .................... 73/335.05
4,336,433 6/1982 Yokozeki ......................... 73/335.05
4,672,180 6/1987 Kusonoki et al. ................ 73/335.02
4,734,554 3/1988 Tateda et al. .......................... 73/73
4,768,378 9/1988 Ando et al. ........................ 73/29.01
4,857,685 8/1989 Vigano et al. ...................... 219/707

FOREIGN PATENT DOCUMENTS 354071445 6/1979 Japan .................................. 219/707
404102053 4/1992 Japan .................................. 219/707

*Primary Examiner*—Diego F. F. Gutierrez
*Attorney, Agent, or Firm*—Christie, Parker & Hale

[57] ABSTRACT

Apparatus and method for removing the influence of microwave noise, without any shielding parts, thus increasing the reliability of detected humidity information. According to the invention, the cumulative difference of humidity values sensed by a humidity sensor is calculated for each half period of a commercial alternating current frequency, oscillating and non-oscillating terms of a magnetron are determined by comparing the calculated cumulative differences with each other, and the humidity-sensed values obtained during the determined non-oscillating terms of the magnetron are used as humidity information for automatic cooking control. In order to even further remove the influence of the microwave noise, the humidity sensor may include capacitors for bypassing the microwave noise introduced into the sensor.

3 Claims, 7 Drawing Sheets

APPARATUS AND METHOD FOR DETECTING HUMIDITY IN A MICROWAVE OVEN

BACKGROUND OF THE INVENTION

1. Field of the Invention

The present invention relates to an apparatus and method for detecting humidity in a microwave oven, and particularly, for reducing or eliminates the affect of microwave noise on an absolute humidity sensor and obtaining a stable output from the sensor.

2. Description of the Prior Art

Generally, a conventional microwave oven contains a sensor for detecting the cooking condition of food to perform an automatic cooking function as one of the essential functions for the microwave oven. An absolute humidity sensor of a thermistor type is generally used as a cooking-condition detecting sensor since it can obtain an output linearly proportional to humidity generated from cooking food irrespective of any surrounding changes. But, microwaves generated by oscillating a magnetron which enter the absolute humidity sensor act as noise and cause errors in the output of the humidity sensor, thus lowering its reliability as a sensor.

In order to remove microwave noise introduced into the sensor in the above-mentioned manner, prior microwave ranges employ expensive parts for shielding noise such as heat-resisting shield wire, ferrite rubber, etc., and thus manufacturing cost is very high.

FIG. 1 is a diagram of a whole microwave oven to which a prior humidity detecting apparatus is applied. A turntable 4 on which a container 18 for food 3 is placed, is disposed at the lower side of a heating room 2 of the microwave oven 1. A driving motor 5 for the turntable is installed below the turntable 4. The heating room 2 has an air suction opening 6 and a microwave guide pipe 7 on one side wall and has an exhaust opening 8 for air and vapor. In the vicinity of the air suction opening 6, there is magnetron 9, a fan 10 and a fan motor 11 for cooling the magnetron and blowing air into the heating room 2, and a driving section 13 for driving the turntable driving motor 5, magnetron 9, fan motor 11 and a magnetron oscillating high voltage transformer 12. Also, in the vicinity of exhaust opening 8, there is provided a humidity sensor 14, and a sensed signal processing section 15 for converting a variation of resistance values of humidity sensor 14 into a variation of voltage values and providing an output as information of cooking progress.

A controller 17 controls the heating of food 3 through driving section 13 according to the cooking progress information from the sensed signal processing section 15 and a key signal from a key matrix 16. A lamp 19 turns on during the cooking operation and a user can see food 3 in the heating room 2.

The operation of such a microwave oven is explained hereinafter.

In FIG. 1, when a user operates the key matrix 16 and selects an automatic cooking function, the controller 17 senses this selection and drives the turntable driving motor 5, the magnetron 9 and the fan motor 11 through the driving section 13, thus the food 3 in the heating room 2 starts to be heated. At the same time, outside air introduced via an inlet port 21 by means of a fan cools the magnetron 9, and a portion of the air is then directly exhausted to atmosphere via an outlet port 20 and the rest supplied into the heating room 2 via the air suction opening 6. The air in the heating room 2 is exhausted to atmosphere via the exhaust opening 8 together with the vapor generated from the heated food 3. The vapor exhausted in this way passes by the humidity sensor 14 and changes the resistance value of the humidity sensor 14, such change being converted into the voltage variation by the sensed signal processing section 15 and supplied to the controller 17 as a humidity-sensed signal. The controller 17 analyzes the inputted humidity-sensed signal and judges the present cooking situation, performing automatic cooking by controlling the output of the magnetron 9 according to the present cooking situation.

FIG. 2 shows a prior humidity sensor 14 which detects humidity, and a sensed signal processing section 15 for processing the sensed signal. The humidity sensor 14 comprises an open-type thermistor TH1 and a closed-type thermistor TH2 which are disposed in the vicinity of the exhaust opening in the heating room. The two thermistors TH1 and TH2 form a bridge circuit together with two resistors R5 and R6 in the sensed signal processing section 15. The sensed signal processing section 15 also includes an operational amplifier OP1 resistors R1 to R4 and a diode D1 for comparing and amplifying the voltage variation outputted from the bridge circuit.

When the vapor is exhausted via the exhaust opening 8 in FIG. 1, the vapor is contacted with the open-type thermistor TH1, thus varying the inner resistance value of the open-type thermistor TH1. The resistance value variation varies the voltage balance of the bridge circuit TH1, TH2, R5 and R6, and the varied voltage value is supplied to the controller 17 as a humidity-sensed signal V out after being compared and amplified by the operational amplifier OP1. In this case, the closed-type thermistor TH2 is used for compensation of sensed temperature.

However, after oscillating the magnetron 9, a microwave noise according to the influence of the microwave leaking out exhaust opening 8, is introduced into the humidity sensor 14, lowering accuracy and reliability in the humidity sensing operation. Thus, there is a problem causing faulty functioning in the automatic cooking performance.

FIGS. 3A and 3B illustrate a prior humidity sensor having a shield structure for blocking microwave noise. As shown in FIGS. 3A and 3B, the sensor comprises an open case 23 which encloses the open-type thermistor TH1 and has a hole 22 for introducing the vapor therethrough, a closed case 24 which encloses the closed-type thermistor TH2, conducting wires 26 connected to leads 25 to which each thermistor TH1 and TH2 are attached, and ferrite rubber 28 and shield wires 27 which in turn cover the conducting wires 26.

But, the rubber 28 and shield wires 27 are very expensive, having a problem of raising the manufacturing cost. Also, with this shield structure it is still difficult to remove the influence of the microwave noise completely.

SUMMARY OF THE INVENTION

An object of the present invention is to provide an apparatus and method for detecting humidity in a microwave oven in which the influence of microwave noise can be completely removed and accurate and reliable humidity detection can be performed.

Another object of the present invention is to provide an apparatus and method for detecting humidity in the microwave oven to enable curtailment of the humidity sensor's manufacturing cost by not employing expensive parts for shielding the microwave noise.

In view of such goals, the present invention provides to an apparatus for detecting humidity in the microwave oven which comprises an absolute humidity sensor which includes a thermistor for sensing humidity and a thermistor for temperature compensation, a sensor output conversion section for converting a detected value of said absolute humidity sensor into a voltage value, means for reading said voltage value outputted from said sensor output conversion section repeatedly and separately for each half period of a commercial alternating current frequency, means for calculating each cumulative difference of said read voltage values for each half period, means for comparing each calculated cumulative difference and determining oscillating and non-oscillating terms of said magnetron according to a relative magnitude of each said calculated cumulative difference respectively, and A/D converting means for A/D converting said determined voltage a magnetron non-oscillation term and providing them as humidity-sensed information.

Moreover, the present invention is to provide a method for detecting humidity in a microwave oven which comprises the steps of reading humidity-sensed values in a humidity sensor repeatedly and separately for each half period of a commercial alternating current frequency used for driving a magnetron, calculating each cumulative difference of said read humidity-sensed values for each half period, comparing each calculated cumulative difference and determining oscillating and non-oscillating terms of the magnetron according to a relative size of each calculated cumulative difference, and A/D converting said humidity-sensed values for said determined non-oscillation term and providing them as humidity-sensed information.

BRIEF DESCRIPTION OF THE DRAWINGS

The above objects and other advantages of the present invention will become more apparent from the following explanation of the preferred embodiments according to the present invention with reference to the attached drawings, in which.

DETAILED DESCRIPTION OF THE INVENTION

Figure 1:
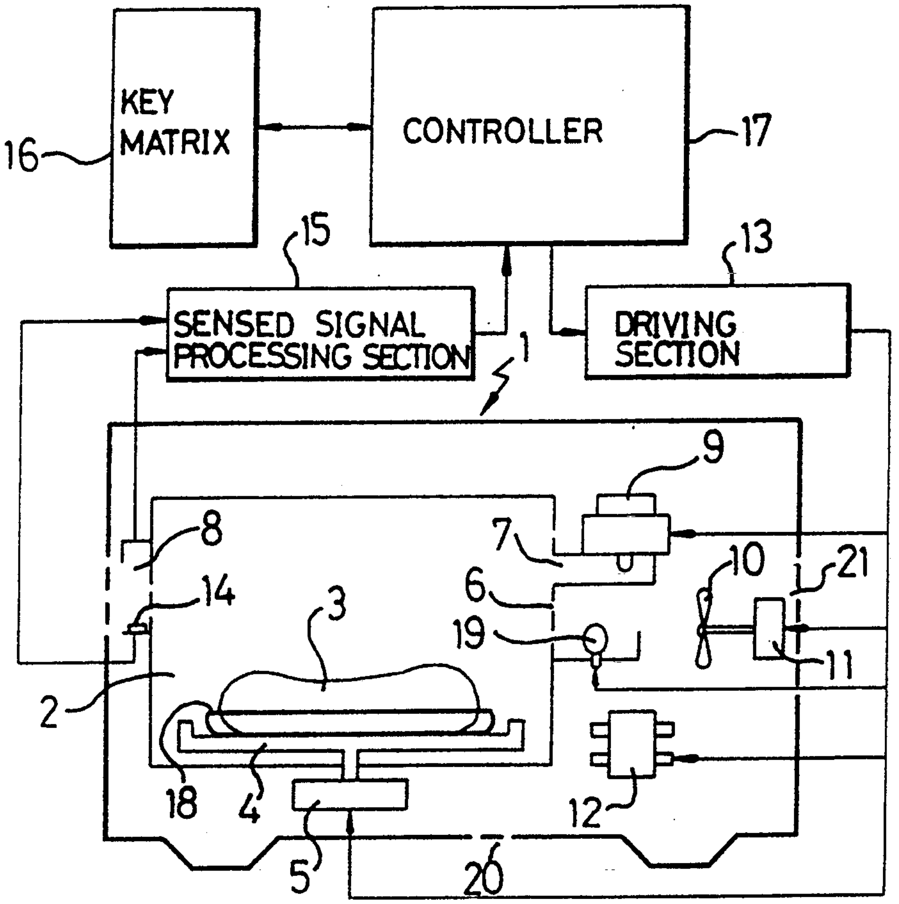
FIG. 1 (PRIOR ART)
FIG. 1 is a diagram of an entire microwave oven to which a prior humidity detecting apparatus is applied.
Figure 2:
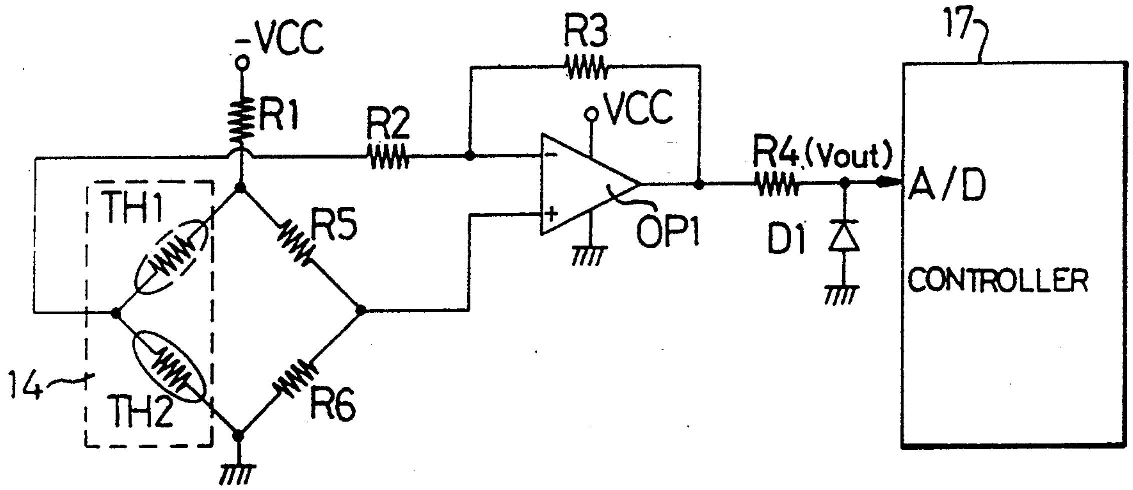
FIG. 2 (PRIOR ART)
FIG. 2 is a detailed circuit diagram of a prior art humidity-sensed signal processing section.
Figure 3A:
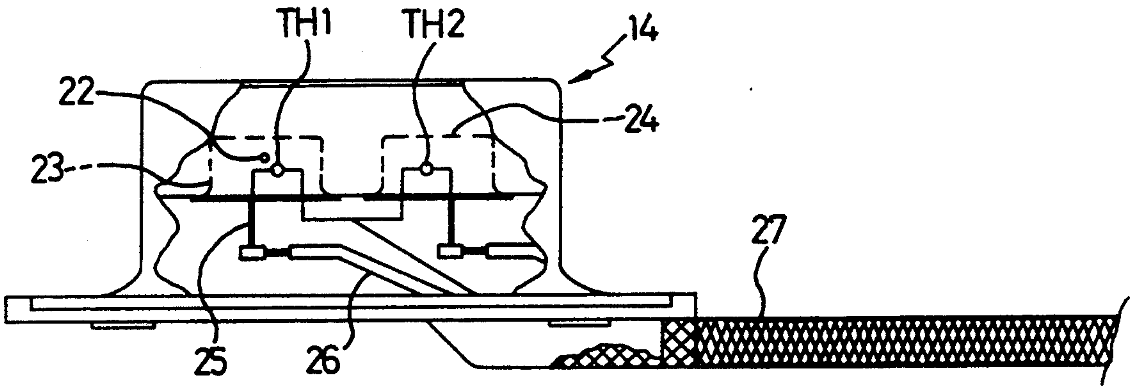
FIG. 3A (PRIOR ART)
FIG. 3A is a sectional view of a prior art humidity sensor.
Figure 3B:
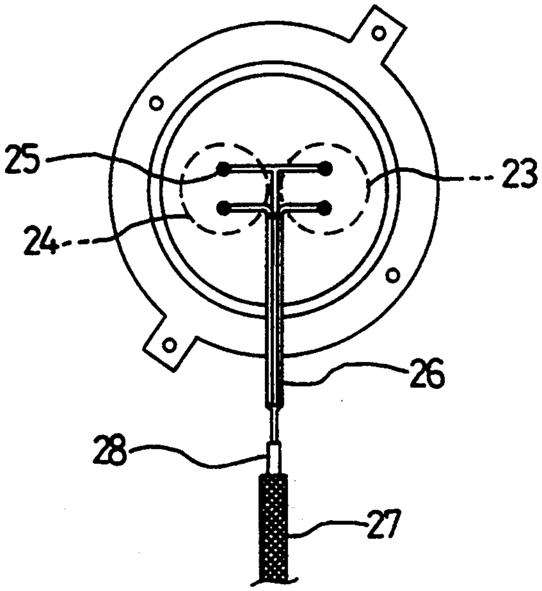
FIG. 3B (PRIOR ART)
FIG. 3B is a bottom view of FIG. 3A.
Figure 4:
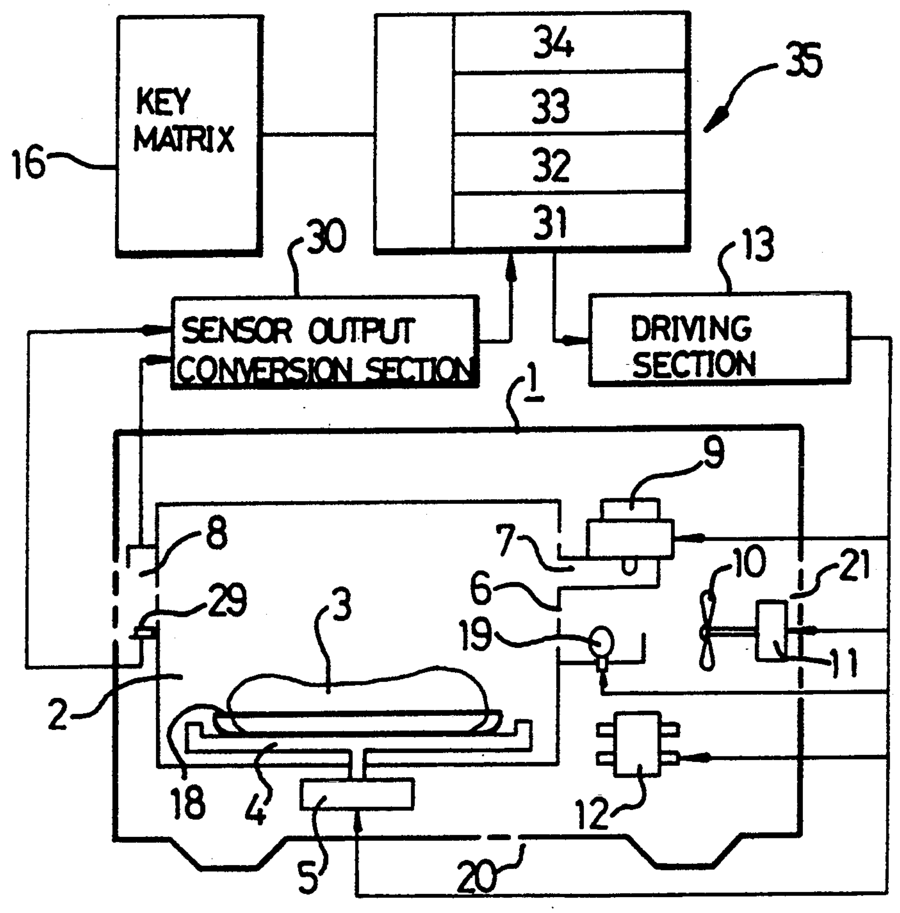
FIG. 4 is a block diagram of an entire microwave oven to which a humidity detecting apparatus according to the present invention is applied.

FIG. 4 illustrates a microwave oven to which a humidity detecting apparatus according to the present invention is applied. A turntable a 1 on which a container 18 for food 3 is placed, is arranged at the lower side in a heating chamber 2 of the microwave oven 1, and a driving motor 5 for the turntable is installed below the turntable 4. The heating chamber 2 has an air suction opening 6 and a microwave guide pipe 7 on one side wall and, on the other side wall, an exhaust opening 8 for air and vapor. In the vicinity of the air suction opening 6, there is a magnetron 9, a fan 10 and a fan motor 11 for cooling the magnetron 9 and blowing air into the heating chamber 2, and a driving section 13 for driving said turntable driving motor 5, said magnetron 9, said fan motor 11 and a magnetron oscillating high voltage transformer 12. Also, a humidity sensor 29 is provided in the vicinity of said exhaust opening 8 in order to detect humidity of vapor generated from food in the heating chamber in accordance with cooking progress. Furthermore, there is provided a sensor output conversion section 30 for converting output values detected from said humidity sensor 29 into voltage values, and a controller 35 for receiving a key signal from a key matrix 16 and an output from said sensor output conversion section as an input signal and controlling cooking function of the microwave oven. There is a lamp 11 for providing light during cooking and an outlet port 20 for exhausting cooling air, as explained in connection with FIG. 1.

The controller 35 comprises a sensed signal reading section 31 for reading said voltage values outputted from said sensor output conversion section 30 repeatedly and for each first half period of a commercial alternating current for driving said magnetron, and separately reading said voltage vales for each second half period an acumulative difference calculating section 32 for calculating differences of voltage values for each said half period read in said sensed signal reading section 31 and accumulating said calculated difference value respectively, a determining section 33 for comparing said cumulated difference values for the first and for the second periods from said calculating section 32 with each other and determining oscillation and non-oscillation of said magnetron for said half period, and an A/D conversion section 34 for converting said detected voltage value for said determined non-oscillation term into a digital value and providing said digital value as a final humidity-sensed indicator.

In the operation of the microwave oven employing the aforementioned apparatus according to the present invention, when a user operates said key matrix 16 and selects an automatic cooking function in FIG. 4, the controller 35 detects said operation and drives the turntable driving motor 5, the magnetron 9 and the fan motor 11 via the driving section 13, thus starting to heat the food 3 in the heating chamber 2.

Vapor generated as the food 3 is heated, is exhausted via the exhaust opening 8 and comes in touch with the humidity sensor 29, changing a resistance value of the humidity sensor 29. Said change of the resistance value of the humidity sensor 29 is converted into a voltage value in the sensor output conversion section 30 and said converted voltage value is provided to the controller 35.

Figure 5:
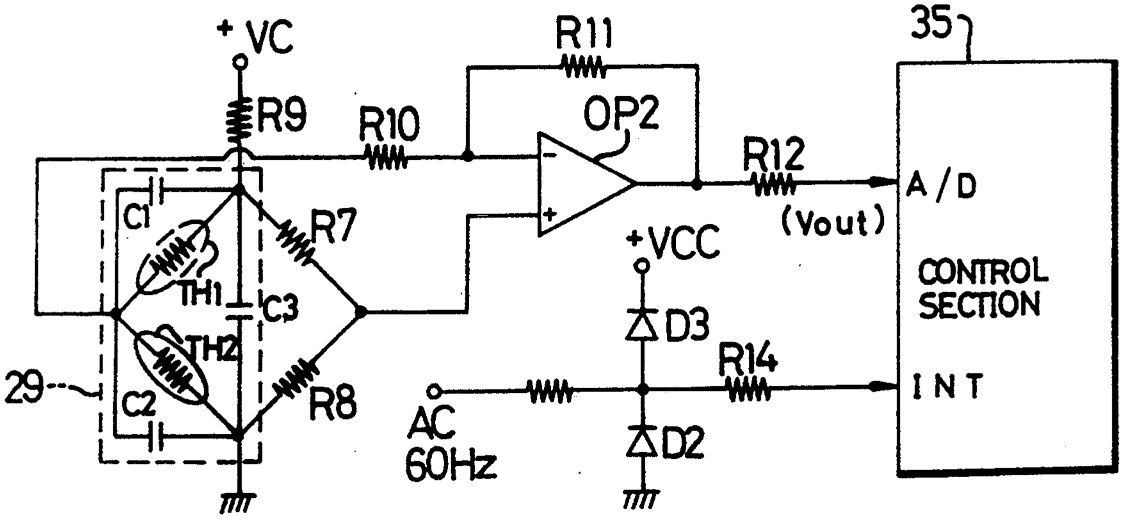
FIG. 5 is a detailed circuit diagram of a sensor output conversion section according to the present invention.
Figure 6A:
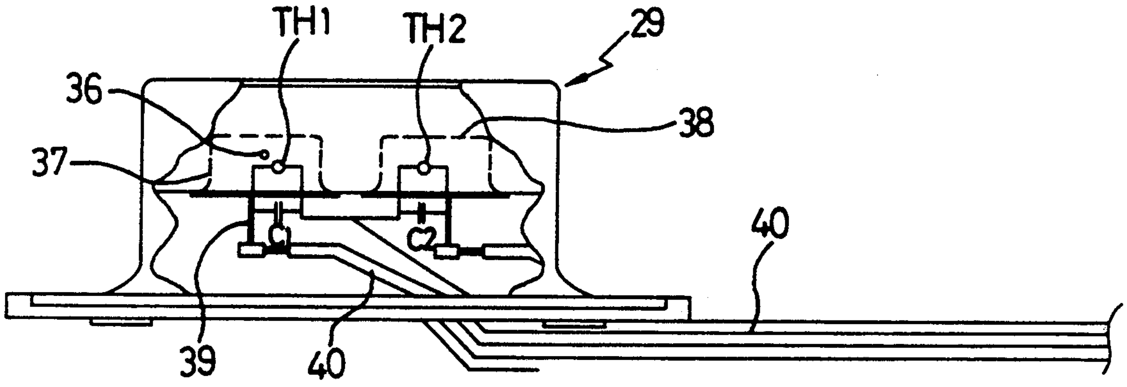
FIG. 6A is a sectional view of a humidity sensor according to the present invention.
Figure 6B:
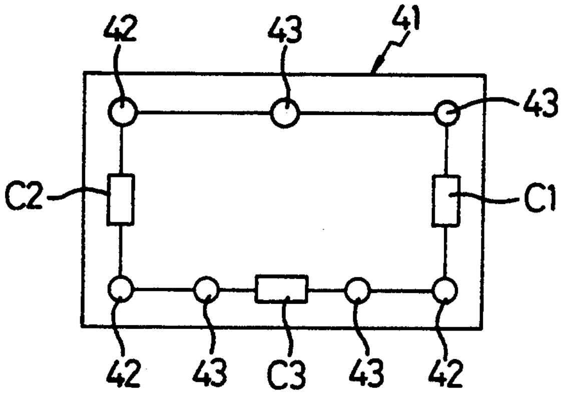
FIG. 6B is a plan view of a circuit board according to the present invention which is provided in the humidity sensor.
Figure 6C:
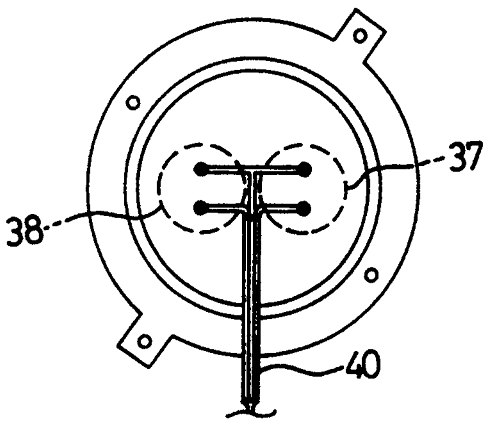
FIG. 6C is a bottom view of the humidity sensor of FIG. 6A.
Figure 6D:
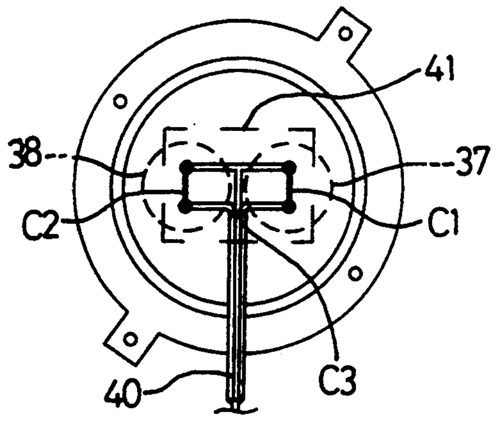
FIG. 6D is a bottom view of the humidity sensor of FIG. 6A in which the circuit board of FIG. 6B is installed.

FIG. 5 is a detailed circuit diagram of the humidity sensor 29 and sensor output conversion section 30. In FIG. 5, the humidity sensor 29 comprises an open-type thermistor TH1 to be in contact with the vapor, a closed-type thermistor TH2 for compensating for use in temperature in the open-type thermistor TH1, and bypass condensers C1, C2 and C3 connected in parallel with said thermistors TH1 and TH2, for bypassing microwave noises introduced into said thermistors.

Said sensor output conversion section 30 comprises resistors R7 and R8 for forming a bridge circuit together with said two thermistors TH1 and TH2, an operational amplifier OP2 for amplifying an output voltage of said bridge circuit and supplying the amplified output voltage to the controller 35, resistors R10, R11 and R12, and diodes D2 and D3 and resistors R13 and R14 for interrupting said controller 35 with the commercial alternating current (60 Hz) for driving the magnetron.

Said humidity sensor 29, as shown in FIGS. 6A to 6D, comprises an open case 37 which encloses the open-type thermistor TH1 and has a hole for introducing the vapor therethrough, a closed case 3g enclosing the closed-type thermistor TH2, conducting wires 40 connected to leads 39 of each thermistor TH1 and TH2, and a circuit board 41 which is disposed in the vicinity of the thermistors TH1 and TH2 and includes microwave bypass condensers C1, C2 and C3, a lead wire hole 43 for drawing out said conducting wires 40 and a hole 42 for mounting said thermistors TH1 and TH2.

Accordingly, the shield structure is not needed in the humidity sensor 29 according to the present invention.

When the vapor generated from the food 3 is exhausted through the exhaust opening 8, a portion of the vapor is introduced into the opening 36 of the open case 37, coming in contact with the open-type thermistor TH1 and varying an inner resistance value of the open-type thermistor TH1. When the inner resistance value of the open-type thermistor TH1 vary in this way, the voltage balance state of the bridge circuit TH1, TH2, R7 and R8 is varies and then the difference value of the voltages is amplified in the operational amplifier OP2, such amplified difference value being supplied to the controller 35 as a humidity indicating voltage V out.

The commercial alternating current (60 Hz) for driving the magnetron is changed into a 60 Hz rectangular wave by on/off diodes D2 and D3 in response to each half period of its positive and negative polarities and the rectangular wave signal is supplied to the controller 35 as an interrupt signal INT.

Accordingly, the controller 35 reads the humidity indicating voltage value V out outputted from the operational amplifier OP2 per every half period (8 ms) of the commercial alternating current (60 Hz) by the inputted interrupt signal, and thus, as explained hereinafter, determines oscillation term and non-oscillation term of the magnetron, receiving the output voltage V out in the non-oscillation term as a humidity-sensed indicator.

Figure 7:
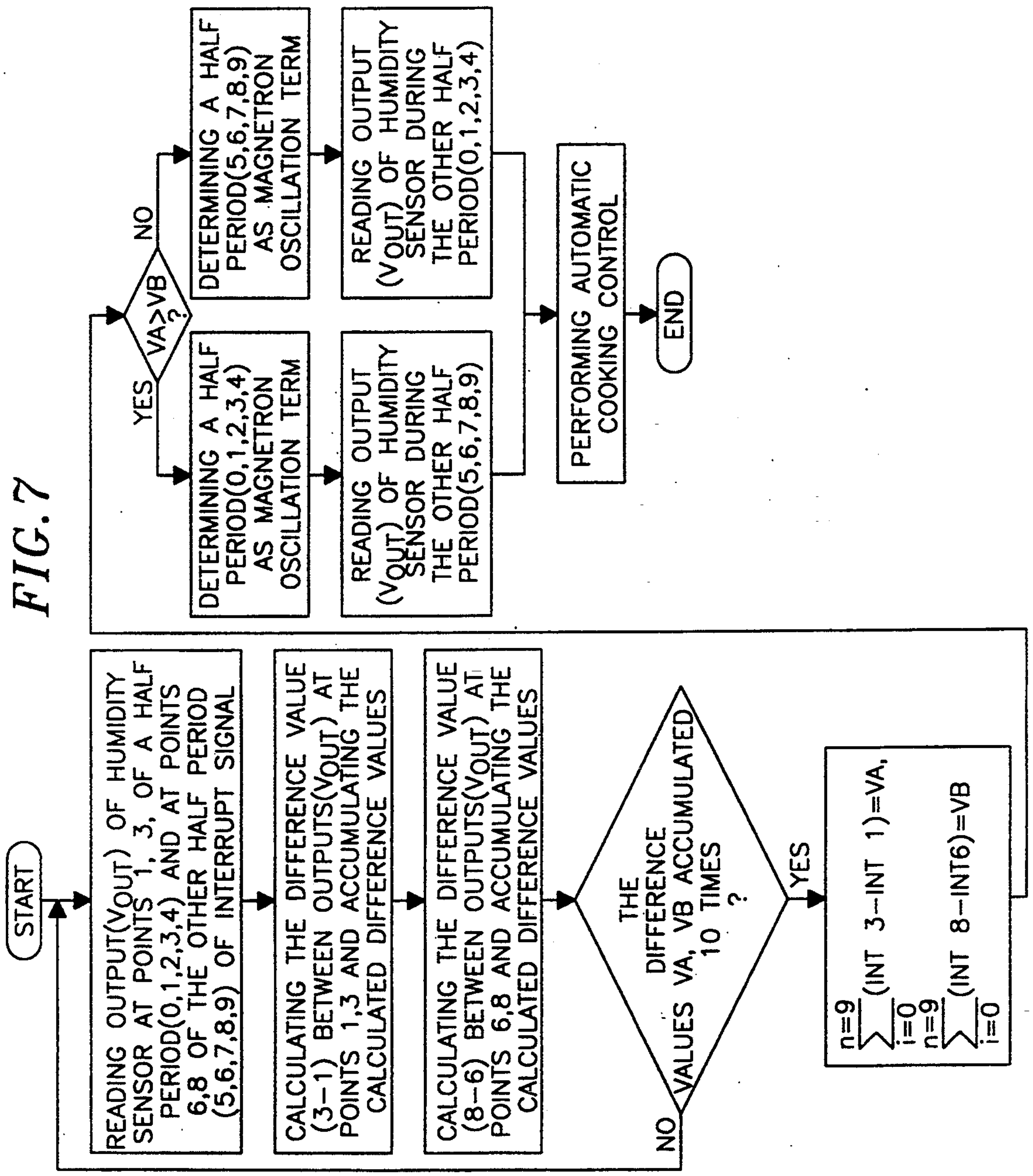
FIG. 7 is a flow chart of a humidity detecting method according to the present invention.
Figure 8:
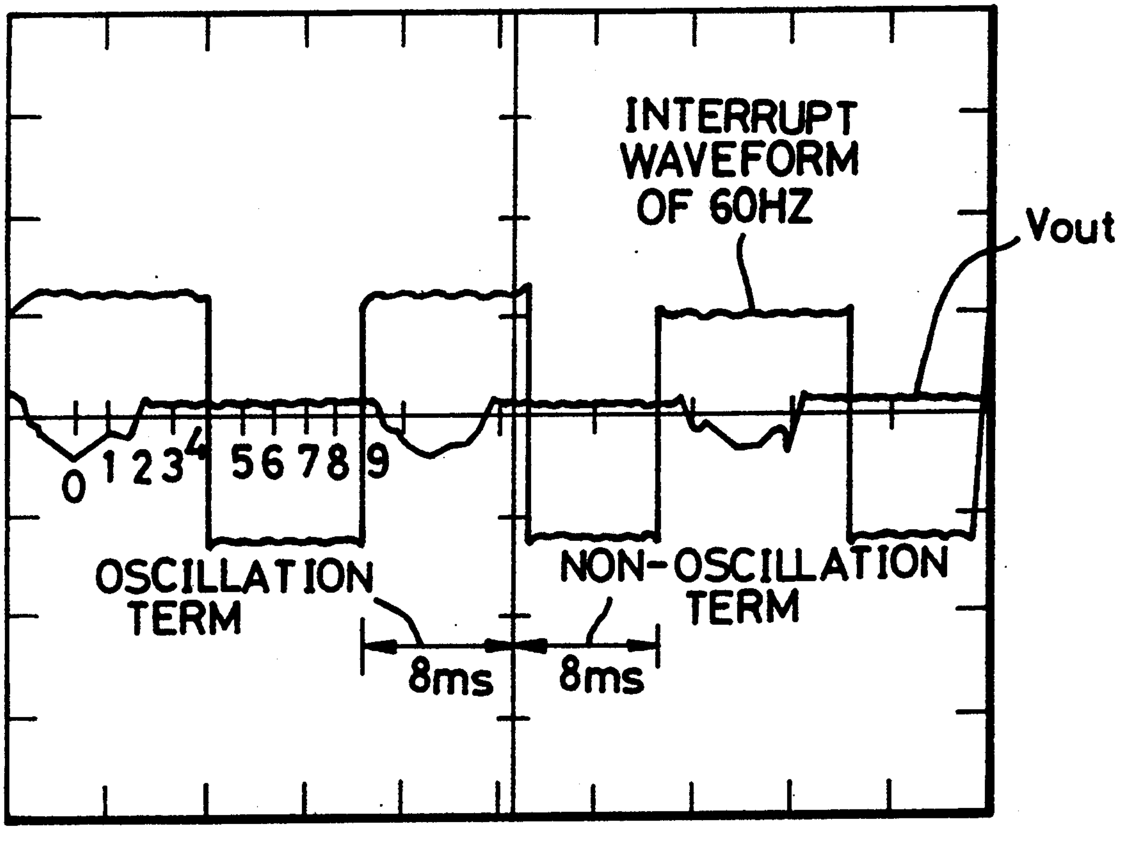
FIG. 8 is a graph of a humidity sensor output and an interrupt waveform for explanation of the operation according to the present invention.

That is, referring to FIGS. 4, 7 and 8, the sensed signal reading section 31 reads the output voltage V out of the sensor output conversion section 30, respectively of one half period and the other half period in one period (=16 msec) of 60 Hz interrupt signal. For example referring to FIG. 8, respective voltage V out is read at points 1 and 3 of the one half period 0 to 4 and points 6 and 8 of the other half period 5 to 9.

The voltages read in this way are supplied to the cumulative difference calculating section 32, which calculates the difference value (INT3–INT1) of the sensor output values V out read at points 1 and 3 of the one half period, such difference value being accumulated and stored. Also, the difference value (INT-8–INT6) of the sensor output voltages V out read at points 6 and 8 of the other half period is calculated and accumulated similarly. Such accumulation procedures for each positive and negative half period are repeated every period by the desired number of times (for example, 10 times) and cumulative voltage values VA and VB for each positive and negative half period are calculated by the following operation:

$$V_A = \sum_{i=0}^{n=9} (INT3 - INT1)$$

$$V_B = \sum_{i=0}^{n=9} INT8 - INT6)$$

The oscillation and non-oscillation term determining section 33 compares said calculated cumulative difference values VA and VB with each other, determining a lesser one of said cumulative difference values as a non-oscillation term of the magnetron and a layer one as a oscillation term "Lesser" and "layer" are determined relative to each other.

The sensor output voltage V out in the non-oscillation term (in FIG. 8, the half period 5 to 8) determined in this way is supplied to an A/D conversion section 34 and converted into a digital signal, such a digital signal being used as a final humidity sensor indication.

As described above, according to the present invention, the humidity sensing operation is performed only during the non-oscillation term of the magnetron 9, thus enabling the influence of the microwave noise to be removed, so that accurate humidity sensor output can be obtained and the accurate automatic cooking can be performed.

Figure 9A:
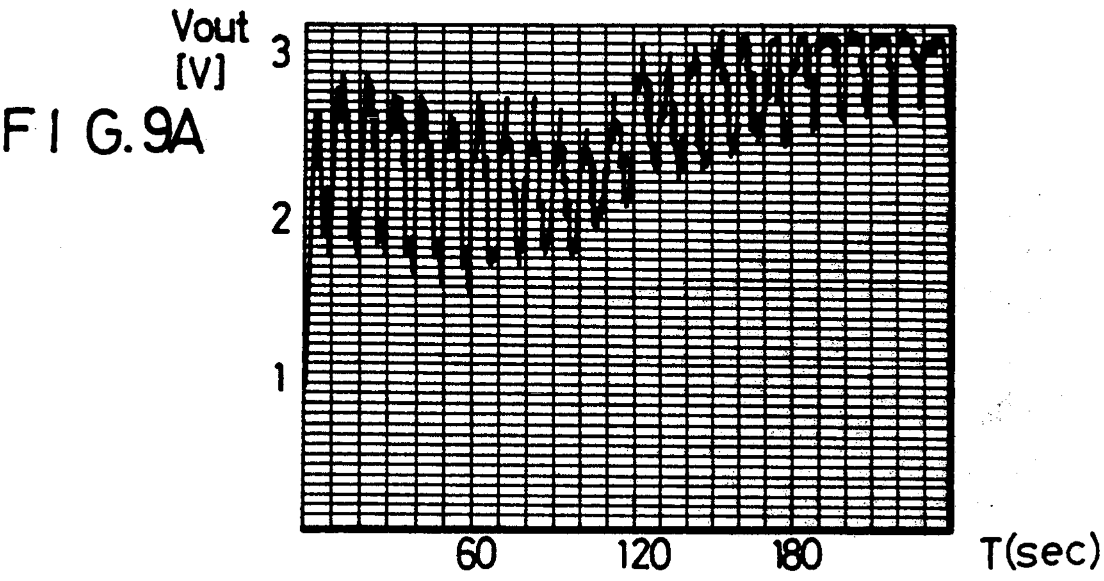
FIGS. 9A to 9C are waveform graphs of the humidity sensor output for explanation of effects according to the present invention.
Figure 9B:
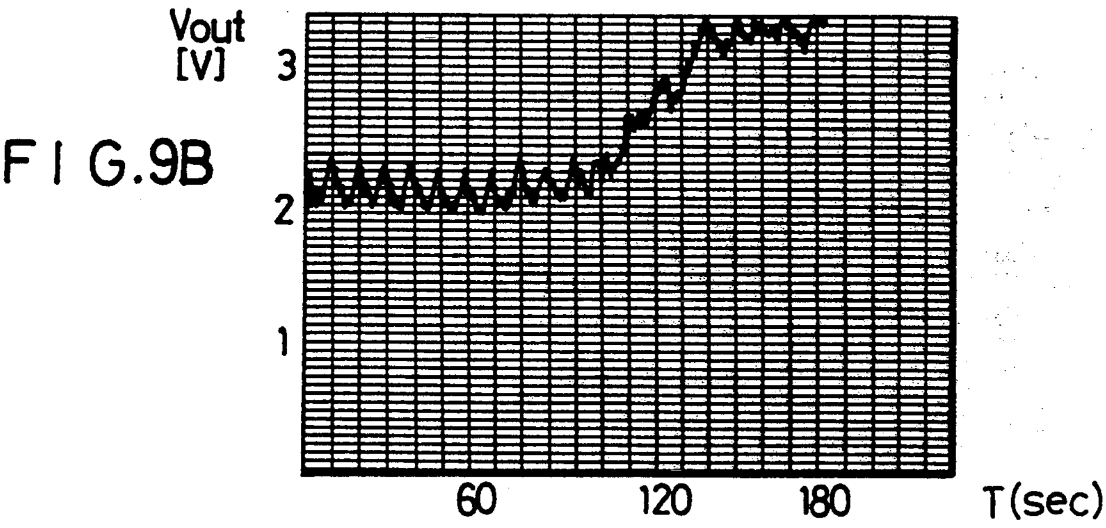
Figure 9C:
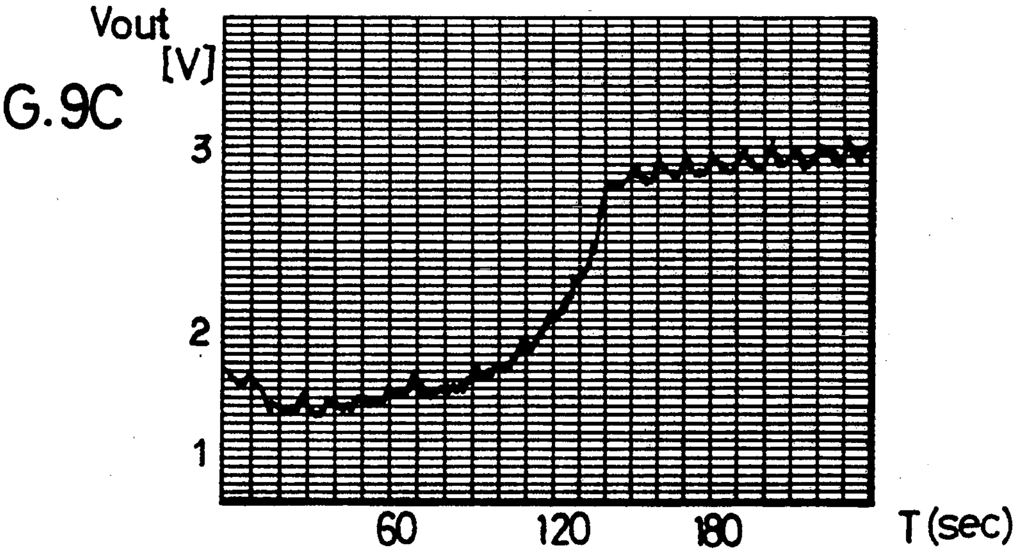

FIG. 9A shows an output waveform of the sensor signal sensed in the humidity sensor without the shield structure, and FIG. 9B shows an output waveform of the humidity sensor signal obtained for the non-oscillation term of the magnetron according to the present invention. FIG. 9C shows an output waveform of the humidity sensor signal obtained for the oscillation term of the magnetron in the state wherein the microwave bypass condensers C1, C2 and C3 are connected.

It is clear from the drawings that the output wave in FIG. 9B according to the present invention removes a large portion of the microwave noise effects compared with the output waveform in FIG. 9A. In FIG. 9C, most of the influence of the microwave noise is removed from the output wave of the humidity sensor signal.

As explained above, according to the present invention, the humidity sensing operation is performed in the state wherein the influence of leaking microwaves due to the oscillation of the magnetron is eliminated, thus improving reliability of the humidity sensor information and enabling accurate automatic cooking.

While the present invention has been described and illustrated herein with reference to the preferred embodiment thereof, it will be understood by those skilled in the art that various changes in form and details may be made therein without departing from the spirit and scope of the invention.

What is claimed is:

1. An apparatus for detecting humidity in a microwave oven, the apparatus having a magnetron driven by an alternating current with a predetermined frequency and period, each period comprising first and second half periods, the apparatus comprising:

an absolute humidity sensor which includes a thermistor for sensing humidity and a thermistor for temperature compensation;

sensor output conversion means for converting a detected value of said absolute humidity sensor into a voltage value;

means for reading said voltage value outputted from said sensor output conversion means repeatedly and separately for each of said first and second half periods of the predetermined frequency;

means for calculating first and second cumulative differences of said read voltage values for each of said first half periods and for each of said second half periods, respectively;

means for comparing each of said first and second calculated cumulative differences, and determining times when said magnetron is oscillating and not oscillating according to which of the first and second calculated cumulative differences is larger and which is lesser relative to each other, respectively; and analog to digital converting means for converting said determined voltage values associated with the time when the magnetron is not oscillating and providing the converted voltage values as humidity sensor information.

2. The humidity detecting apparatus as claimed in claim 1, wherein said absolute humidity sensor further comprises at least one microwave bypass condenser.

3. A method for detecting humidity in a microwave oven the apparatus having a magnetron driven by an alternating current with a frequency and period, each period comprising first and second half periods, comprising steps of:

reading humidity-sensed values in a humidity sensor repeatedly and separately for each of said first and second half periods of the predetermined frequency; calculating first and second cumulative differences of said read humidity-sensed values for each said half period;

comparing said first and second calculated cumulative differences and determining times when said magnetron is oscillating and not oscillating according to which of the first and second calculated cumulative differences is larger and which is lesser relative to each other; and analog to digital converting said humidity-sensed values associated with the time when the magnetron is not oscillating and providing the converted voltage values as humidity-sensed information.

* * * * *

UNITED STATES PATENT AND TRADEMARK OFFICE

CERTIFICATE OF CORRECTION

PATENT NO. : 5,445,009

DATED : August 29, 1995

INVENTOR(S) : Woo J. Yang; Hyoung T. Lim; Sung J. Han

It is certified that error appears in the above-indentified patent and that said Letters Patent is hereby corrected as shown below:

Column 1, line 9, change "eliminates" to -- eliminating --.
Column 1, line 29, before "manufacturing" insert -- their --.
Column 1, line 67, before "supplied" insert -- is --.

Column 2, line 33, change "V out" to -- $V_{out}$ --.

Column 3, line 5, before "an apparatus" delete "to".
Column 3, line 19, delete "said".
Column 3, line 24, replace "is to provide" -- provides --.

Column 4, line 12, after "turntable" delete "a".
Column 4, line 42, before "for each" delete "and".
Column 4, line 44, change "valves" to -- values --.
Column 4, line 50, change "cumulated" to -- cumulative--.
Column 4, line 53, change "said" (2nd Occurrence) to --each --.

Column 5, line 46, after "R8" delete "is".
Column 5, lines 49,57,62,65, change "V out" to -- $V_{out}$ -- (all occurrences).

UNITED STATES PATENT AND TRADEMARK OFFICE

CERTIFICATE OF CORRECTION

PATENT NO. : 5,445,009

DATED : August 29, 1995

INVENTOR(S) : Woo J. Yang; Hyoung T. Lim; Sung J. Han

It is certified that error appears in the above-indentified patent and that said Letters Patent is hereby corrected as shown below:

Column 6, lines 1,7,10,33, change "V out" to -- $V_{out}$ -- (all occurrences).

Column 6, lines 29,30, change "layer one as a oscillation term "Lesser" and "layer" are" to -- larger one as an oscillation term. "Lesser" and "larger" are --.

Signed and Sealed this

Twentieth Day of August, 1996

Attest:

BRUCE LEHMAN

*Attesting Officer*

*Commissioner of Patents and Trademarks*